Patented May 11, 1948

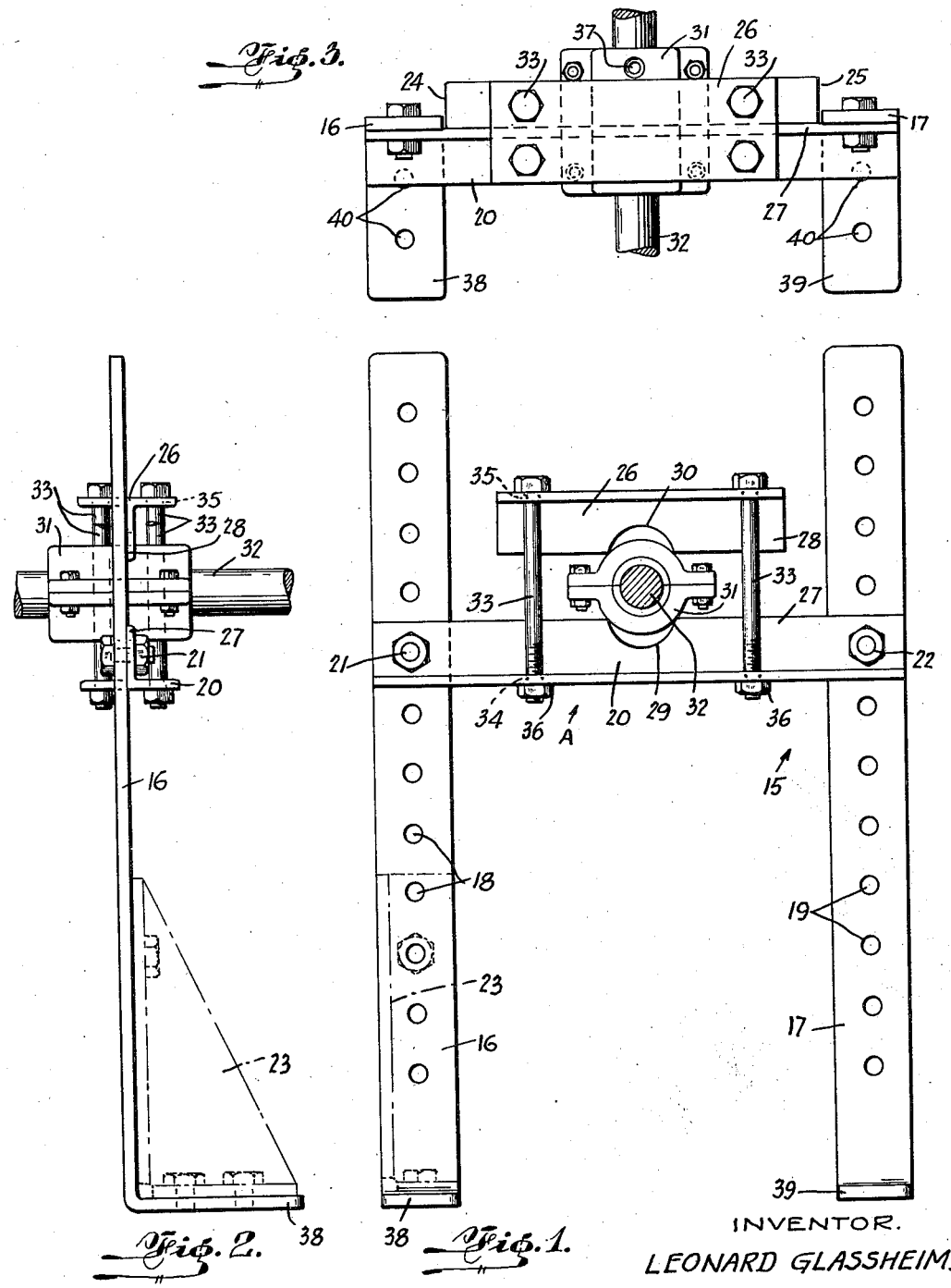

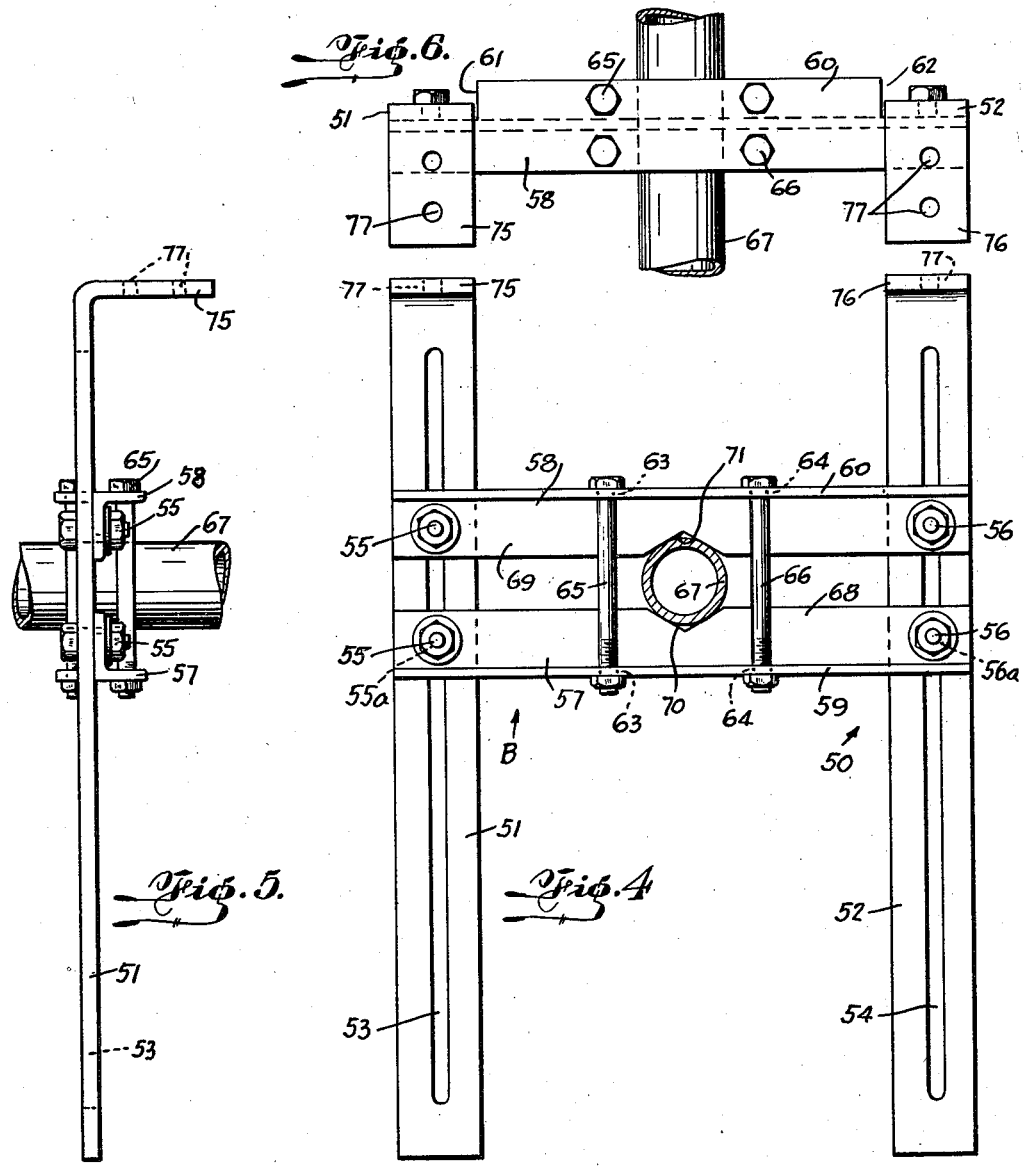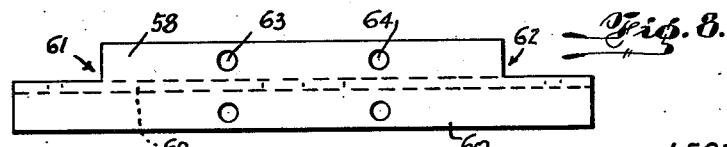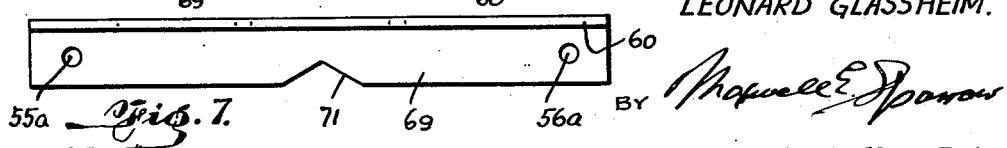

2,441,191

UNITED STATES PATENT OFFICE 2,441,191

HANGER

Leonard Glassheim, Rockaway Beach, Long Island, N. Y.

Application May 1, 1945, Serial No. 591,315

3 Claims. (Cl. 248—59)

This invention relates to improvements in pipe and shaft supports.

It is an object of the present invention to provide efficient, economical and practical adjustable supports for shafts, pipes and the like.

It is a further object of the present invention to provide a shafting support readily adjustable for clamping various sizes and types of shaft bearings.

It is a still further object of this invention to provide a shafting or pipe support which can readily be changed by reversing of the upright members into either floor-supported or ceiling-suspended brackets.

Another object of this invention is to provide an economical bearing and pipe support readily constructed from commercially available material.

Still another object of the present invention is to provide a pipe or shaft support which is of simple, durable and inexpensive construction.

Yet a still further object of the present invention is to provide an adjustable pipe or shaft support having parts which can be conveniently and easily assembled for the purpose intended.

Further objects and advantages of the invention will appear from the following disclosure thereof together with the attached drawings which illustrate certain forms of embodiment thereof. These forms are shown for the purpose of illustrating the invention which is believed to give satisfactory and reliable results. It is to be understood that the instrumentalities of which the invention consists can be variously arranged and organized and that the invention is not limited to the precise arrangement and organization of the instrumentalities as herein shown and described.

In the drawings:

Fig. 1 is a front elevation of a shaft support constructed in accordance with the invention;

Fig. 2 is a side elevation of Fig. 1;

Fig. 3 is a top plan view of Fig. 1;

Fig. 4 is a front elevational view of a device made in accordance with the invention in a modified form, showing a ceiling-suspended pipe hanger;

Fig. 5 is a side elevation of Fig. 4;

Fig. 6 is a top plan view of Fig. 4;

Fig. 7 is a front elevation in detail of one of the clamping members; and

Fig. 8 is a top plan view of Fig. 7.

Referring now more particularly to the drawings. In Figs. 1-3, inclusive, there is disclosed a shaft support generally indicated by the numeral 15 comprising upright members 16—17, provided with perforations 18—19, respectively, for the adjustable securing of the horizontal support member 20 by means of the bolts 21, 22. Upright members 16, 17 are preferably made of flat stock sufficient in strength for the particular load to be carried.

If desired angular reinforcing gussets as indicated at 23 may be used to stiffen the upright members 16, 17.

The horizontal member 20 is preferably made of commercial T-cross-sectional metal. To clear the upright members 16, 17, it will be necessary to cut out portions of the horizontal flange as indicated at 24 and 25. Directly above the horizontal member 20 is a shorter member 26 of the same cross-sectional shape as the member 20. The vertical portions 27 and 28, of the horizontal members 20 and 26 are preferably cut out as at 29 and 30, thus facilitating the clamping of a conventional bearing unit 31 in which a conventional shaft 32 is rotatably mounted. Four bolts 33 pass through holes 34 and 35 of the horizontal portions of the supports 20, 26, respectively.

It is understood that tightening of the nuts 36 of bolts 33 will cause members 20, 26 to securely clamp the bearing 31. As only the vertical members 27, 28 are in contact with bearing 31 it is obvious that any oil holes, such as, indicated at 37 will be readily accessible. The uprights 16, 17 have the horizontal leg members 38, 39, provided with holes 40 for securement of the uprights 16, 17 to a floor or other support.

It is understood that in case reinforcing gussets 23 are employed the bolt holes 18, 19 and 40 will be utilized for securing the same to the uprights 16, 17.

It is obvious that adjustment along the uprights 16, 17 of the bearing carrier or holder A is made possible by means of the bolts 21, 22 and perforations 18, 19.

Referring now to Figs. 4-8, inclusive, the support is generally indicated by the numeral 50 and comprises upright members 51, 52 provided with the longitudinal slots 53, 54 for height adjustment purposes of the bearing, shaft or pipe carrier or holder B. Secured to uprights 51, 52 as by means of bolts 55, 56, passing through the slots 53, 54 are horizontal cross members 57, 58 preferably made of conventional T cross-sectioned material. These T members 57, 58 have their horizontal flanges 59, 60 cut out as at 61, 62 so as to clear the upright members 53, 54. Bolt holes 63, 64 are provided in the horizontal flanges 59, 60 of the T members for the passage of the bolts 65, 66, the tightening of which will cause the horizontal T members 57, 58, to securely clamp therebetween a member or device 67, such as, a pipe, shaft, bearing, etc. The vertical flanges 68, 69 are preferably provided with cut-outs 70, 71 to facilitate the centering and clamping of the device 67.

Members 51, 52 are preferably provided with the horizontal leg extensions 75, 76, respectively, for securing the upright members 51, 52, to such a structure as a ceiling, by means of bolts (not shown) passing through the openings 77.

The two typical support arrangements shown in the drawings vary in that, in Figs. 1 to 3, inclusive, a long horizontal clamping member 20 and a short horizontal clamping member 26 are utilized, thus permitting the use of a plurality of bolt holes 18, 19, for height adjustment purposes; whereas, in Figs. 4 to 6, inclusive, two equally-long horizontal clamping members 59, 60, are adjustably secured to the upright members 51, 52, by means of bolts 55, 56, passing through slots 53, 54. When two equally-long horizontal members are used, the utilization of slots 53, 54, instead of perforations 18, 19, becomes obvious. As the diameter of the member 67 to be clamped varies, it may not be possible to align holes 55a, 56a with holes, if such were provided, in the uprights 51, 52, instead of slots 53, 54.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Although the drawings, and the above specification disclose the best modes in which I have contemplated embodying my invention, I desire in no way to be limited to the details of such disclosure, for in the further practical application of my invention many changes in the forms and proportions may be made as circumstances require or experience suggests without departing from the spirit of the invention within the scope of the appended claims.

Having thus described my invention what I claim as new and desire to secure by Letters Patent is:

1. In a support having a pair of spaced uprights and a cross member secured to said uprights, a longitudinal member spaced from said cross member, and means maintaining said members in spaced relation, each of said members having a vertically projecting flange, said flanges having cut-out portions facing each other adapted to engage the surface of a bearing, pipe, shaft or the like.

2. In a support having a pair of spaced uprights, a holder for a pipe, shaft, bearing or like device, and means for adjustably securing said holder to said uprights; said holder comprising spaced longitudinal members, said members having complementary recessed portions adapted to receive therebetween said device, said portions being relatively adjustable.

3. In a support having a pair of spaced uprights, a holder for a pipe, shaft, bearing or like device, and means for adjustably securing said holder to said uprights; said holder comprising spaced longitudinal members, said members having complementary recessed portions adapted to receive therebetween said device, said portions being relatively adjustable, said uprights having projecting portions for securement thereof to a part of a building.

LEONARD GLASSHEIM.

REFERENCES CITED

The following references are of record in the file of this patent:

UNITED STATES PATENTS

| Number | Name | Date |
|--------|------|------|
| 699,943 | Brinley | May 13, 1902 |
| 833,126 | Cypher | Oct. 9, 1906 |